(12) United States Patent
Postolek et al.

(10) Patent No.: US 6,807,340 B2
(45) Date of Patent: Oct. 19, 2004

(54) FIBER BRAGG GRATING DISPERSION COMPENSATOR

(75) Inventors: Henry Postolek, Ottawa (CA); Graham Ian Duck, Ottawa (CA); Nenad Duricic, Nepean (CA); Gonzalo de la Puente, Ottawa (CA); Tinko Eftimov, Ottawa (CA); Dan Grobnic, Ottawa (CA); David William Charles Markin, Ottawa (CA); Martin Matthews, Kanata (CA); Evgueni A. Ponomarev, Ottawa (CA); Serguei Roupassov, Ottawa (CA); Dariusz Sieniawski, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 147 days.

(21) Appl. No.: 10/229,095

(22) Filed: Aug. 28, 2002

(65) Prior Publication Data

US 2003/0142911 A1 Jul. 31, 2003

Related U.S. Application Data

(60) Provisional application No. 60/351,381, filed on Jan. 28, 2002.

(30) Foreign Application Priority Data

Jan. 28, 2002 (CA) .............................................. 2369953

(51) Int. Cl.[7] ................................................ G02B 6/34
(52) U.S. Cl. ......................................... 385/37; 398/81
(58) Field of Search ............................. 385/37; 398/81

(56) References Cited

U.S. PATENT DOCUMENTS

| 5,671,307 A | | 9/1997 | Lauzon et al. ................. 385/37 |
| 5,694,501 A | | 12/1997 | Alavie et al. .................. 385/37 |
| 5,987,200 A | * | 11/1999 | Fleming et al. ................ 385/37 |
| 6,148,127 A | | 11/2000 | Adams et al. .................. 385/37 |
| 6,307,988 B1 | | 10/2001 | Eggleton et al. ............... 385/37 |
| 6,351,585 B1 | * | 2/2002 | Amundson et al. ............ 385/37 |
| 6,374,014 B1 | * | 4/2002 | Jablonski ....................... 385/37 |
| 6,411,746 B1 | * | 6/2002 | Chamberlain et al. ......... 385/2 |
| 6,636,667 B2 | * | 10/2003 | Wang et al. ................... 385/37 |
| 2002/0048430 A1 | * | 4/2002 | Hashimoto et al. ........... 385/37 |
| 2003/0072531 A1 | * | 4/2003 | Putnam et al. ................. 385/37 |

OTHER PUBLICATIONS

"Integrated Tunable Fiber Gratings for Dispersion Management in High–Bit Rate Systems" Eggleton et al., Journal of Lightwave Technology, vol. 18, No. 10, Oct. 2000, pp. 1418–1432.

"Implementation and Characterization of fiber Bragg Gratings Linearly chirped by a temperature gradient", Lauzon et al., Optics Letters, vol. 19, No. 23 pp. 1–5, Dec. 1994.

\* cited by examiner

*Primary Examiner*—Edward J. Glick
*Assistant Examiner*—Thomas R Artman
(74) *Attorney, Agent, or Firm*—Teitelbaum & MacLean; Neil Teitelbaum; Doug MacLean

(57) ABSTRACT

A dispersion compensator has a linearly chirped fiber Bragg grating mounted at two ends of an elongated, channel-shaped heat distributor. The distributor has two thermo-electric coolers at two ends, a heating strip for uniform heating of the distributor, a temperature sensor mounted on the distributor in the middle of the grating region, and longitudinally variable heating means attached to the distributor and extending along its length for effecting a longitudinally varying heating of the grating region. The provision of the heating strip helps maintain linearity of the thermal gradient of the distributor while the longitudinally variable heaters facilitate relatively fast dithering of the temperature of the grating region.

17 Claims, 6 Drawing Sheets

FIBER BRAGG GRATING DISPERSION COMPENSATOR

RELATED APPLICATIONS

This application claims priority from U.S. Provisional Application No. 60/351,381 filed Jan. 28, 2002 entitled "THERMALLY TUNABLE FIBER BRAGG GRATING DISPERSION COMPENSATOR" and CA informal Application No. 2,369,953 filed Jan. 28, 2002 entitled "THERMALLY TUNABLE FIBER BRAGG GRATING DISPERSION COMPENSATOR"

TECHNICAL FIELD

This invention relates to fiber Bragg grating dispersion compensation, and particularly to a thermally tunable fiber Bragg grating dispersion compensator.

BACKGROUND OF THE INVENTION

One of the key issues in modern high-speed optical networks is the necessity to compensate for the optical pulse broadening caused by optical fiber chromatic dispersion. With the advance of new generations of fast networks (40 Gb/sec and higher), the ability to precisely compensate for the dispersion becomes critical for the network operation thus necessitating dispersion compensation components with variable dispersion capabilities.

Efforts to compensate for chromatic dispersion have involved thus far the use of etalon-based systems, dispersion compensating fibres, dispersion compensating gratings, e.g. fiber Bragg gratings (FBG), or a combination of both. A device described in a paper "Implementation and characterization of fiber Bragg gratings linearly chirped by a temperature gradient", J. Lauzon et al, Optics Letters, Vol. 19, No. 23, pp. 2027–2029, December 1994, has a heat distributor and thermoelectric coolers to control the end temperatures of the distributor.

Various dispersion compensating systems are also described in patent literature, e.g. U.S. Pat. No. 5,671,307 issued to Lauzon et al., U.S. Pat. No. 6,148,127 issued Nov. 14, 2000 to Adams et al, U.S. Pat. No. 5,694,501 issued Dec. 2, 1997 to Alavie et al. (now assigned to the present assignee), and U.S. Pat. No. 6,307,988 issued Oct. 23, 2001 to Eggleton et al.

It is desirable to provide a tunable dispersion compensator (DC), preferably over a broad dispersion range. The key element of a popular type of a DC is a linearly chirped fiber Bragg grating (FBG), a diffractive grating with a linearly varying pitch (refractive index perturbation) written inside an optical fibre. Optical pulse broadening comes from the fact that the pulse's frequency components travel with different velocities, so that the longer wavelength components lag the shorter ones. In a chirped FBG, the location of resonant Bragg condition (reflection point) will be wavelength dependent. This causes a time-of-flight difference between longer and shorter wavelength equivalent to a chromatic dispersion added to the pulse.

Since silica used for fibre manufacturing has a temperature dependent refractive index and the fibre itself has certain thermal expansion coefficient, the grating local resonant wavelength becomes temperature dependent and varies as $\Delta\lambda = S_T \Delta T$, where $S_T \approx 10$ pm/K is the grating thermo-optical sensitivity.

In a linearly chirped grating, i.e. grating with the reflection position varying linearly with wavelength, group delay will be a linear function of wavelength and, after differentiation, yields uniform dispersion across the grating wavelength range (bandwidth). Any deviations of group delay from the linear profile called group delay ripple (GDR) distort the shape of an optical pulse and thus they are highly undesirable.

If one creates a uniform temperature gradient along a linearly chirped FBG, the grating chirp changes but remains linear thus giving rise to a different dispersion value. Based on this fact one can design a dispersion compensator with a thermally tuneable dispersion. Unfortunately, as is commonly known, an elongated object heated at two ends, due to thermal losses, will exhibit a non-linear temperature profile, the temperature deviation from linearity being greatest in the middle. In the case of a distributor housing a chirped Bragg grating, such thermal losses (dubbed here "temperature sagging") amount to an undesirable group delay ripple (GDR).

It is desirable to provide a DC capable of maintaining a uniform temperature gradient on the FBG, typically a chirped FBG.

It is further desirable to provide a DC with means for varying the temperature gradient at a relatively high rate, preferably maintaining the temperature gradient linearity.

SUMMARY OF THE INVENTION

In accordance with one aspect of the invention, there is provided a dispersion compensator comprising: a length of a waveguide including a grating region having two opposite ends, a heat distributing body extending along the grating region and adjacent to the grating region, and a heating strip mounted to the body and extending along the grating region for controlled heating of the entire grating region.

The compensator may have a temperature sensor disposed intermediate the ends of the grating region, preferably at the center of the grating region, for generating a signal indicative of the temperature of the respective region of the distributor. Preferably, the grating region is a chirped Bragg grating, e.g. a linearly chirped Bragg grating to afford an efficient compensation of chromatic dispersion.

The compensator may further include a longitudinally variable heating means adjacent to and extending along the length of the distributing body and the grating region for effecting a longitudinally varying heating of the grating region, the heating means having a monotonic heating-intensity variance along the length of the grating region.

In one embodiment, the compensator has two terminal heating/cooling means adjacent the ends of the grating region for heating at least the end parts of the grating region.

As indicated above, it is desired to create a linear temperature profile along the Bragg grating. To this end, according to the invention, the grating is disposed in a close proximity of a heat distributor, preferably inside a heat distributor. Tests have shown that the provision of the distributor, made of a material of high thermal conductivity and preferably but not necessarily with a thermal expansion coefficient (CTE) identical or close to CTE of the material of the grating (glass), is beneficial in maintaining a linear variance of temperature along the grating.

Dispersion dependence on temperature difference at the ends of the grating can be expressed as $$D = \left(\frac{1}{D_0} + \frac{cS_T}{2n}\frac{\Delta T}{L}\right)^{-1}$$

where $D_0$ is the dispersion of the grating without temperature gradient ("nominal" dispersion), L is the grating length, n is refractive index of the optical fibre in which the grating is imprinted, $S_T$ is as explained above and c is the speed of light. Based on the desired dispersion tuning range, one can calculate the required temperature range. In order to maintain the device's bandwidth centred at a particular wavelength, the grating center temperature should remain constant. A sensor, e.g. a thermistor placed at the centre of the distributor provides the necessary feedback for the uniform heater control loop. For a linear temperature profile, the temperature at the middle of the distributor (and thus at the middle of the grating region) should be maintained at $(T1+T2)/2$ where T1 and T2 are the temperatures at the respective ends of the distributor. A central control unit may be provided to respond to the signal generated by the sensor.

BRIEF DESCRIPTION OF THE DRAWINGS

The invention will be explained in more detail by way of the following description in conjunction with the drawings in which.

DETAILED DESCRIPTION OF THE INVENTION

Figure 1:
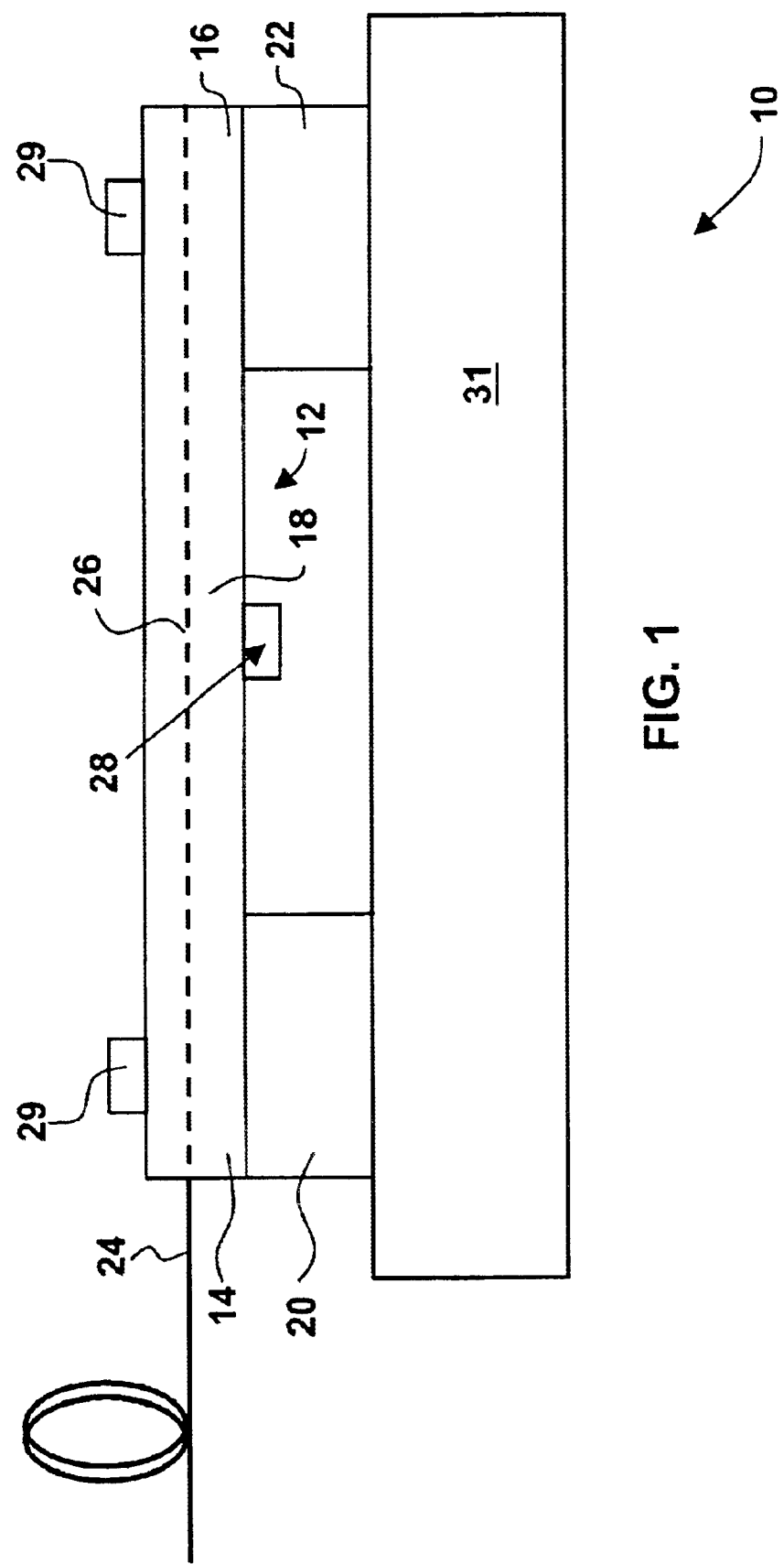
FIG. 1 is a schematic side view of the dispersion compensator o the invention.
Figure 2:
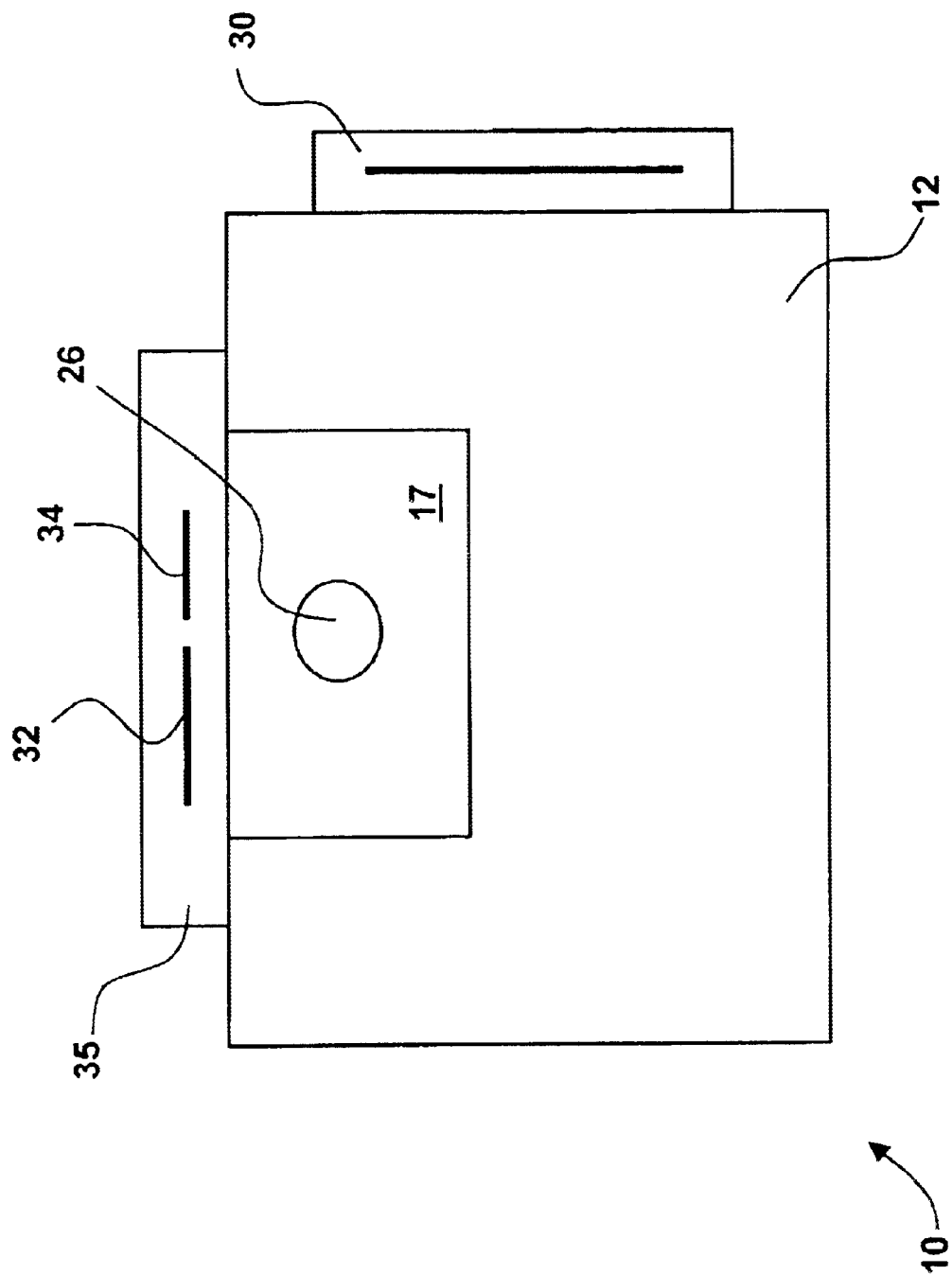
FIG. 2 is a schematic cross-sectional view of the compensator of FIG. 1.
Figure 5:
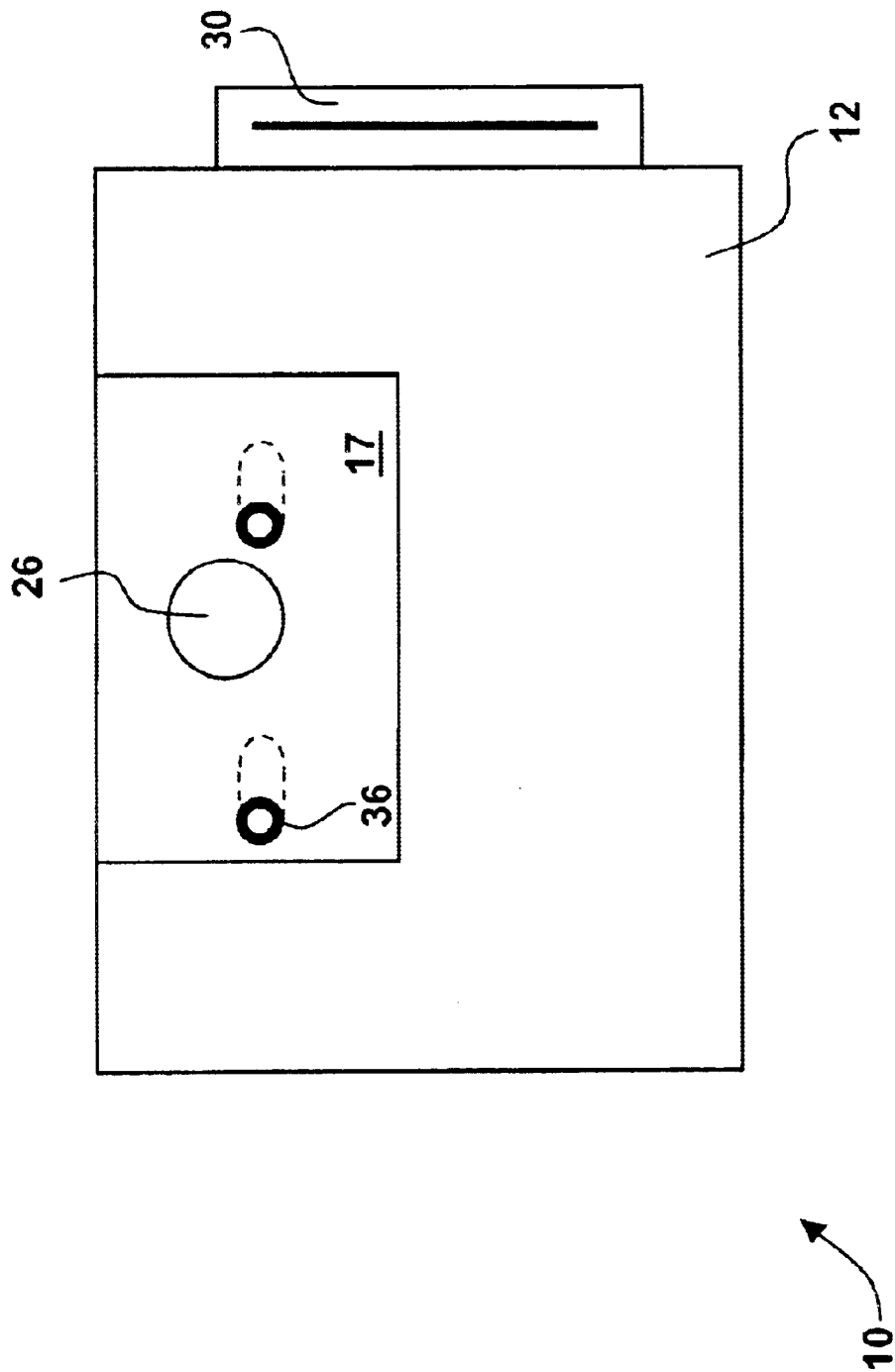
FIG. 5 is a cross-sectional view of the embodiment of FIG. 4.
Figure 6:
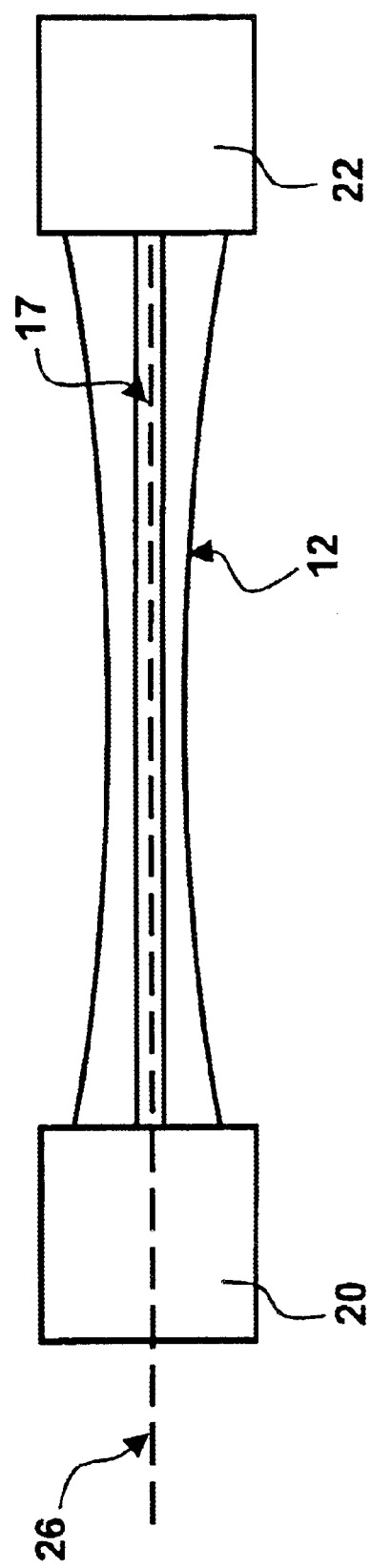
FIG. 6 is a schematic top view of the distributor showing the channel and the varying wall thickness.

As shown in FIGS. 1 and 2, the dispersion compensator 10 has an elongated heat distributor 12 made e.g. from a CuW alloy or another material with high thermal conductivity, which features two end parts 14 and 16 and a middle portion 18. The distributor forms a channel 17 as seen in FIG. 2, FIG. 5 and FIG. 6. It is preferable that the cross-section of the channel 17 is constant through the length of the channel. The thickness of the side walls of the distributor 12, and/or the bottom wall thereof, may be varied, e.g. profiled as shown in FIG. 6 so that the thickness is smallest in the mid-region of the distributor. This provision is intended to make the heat flux throughout the distributor relatively constant so that the temperature gradient can be relatively constant as well. The narrowing may be in the range of a few percent, depending on the dimensions of the components, and may be determined by experimenting or modeling.

The compensator is preferably placed inside a chamber, or casing (not illustrated for clarity), made of a heat-conductive material, so that a relatively uniform ambient temperature is maintained in the vicinity of the dispersion compensator.

Two thermoelectric coolers (TEC) 20, 22 are disposed at, and attached to, the end parts 14 and 16 of the heat distributor 12. The TECs are electrically connected to a source of electric energy and to a central control unit (not shown).

A length of a waveguide 24 for reflecting an optical signal in need of dispersion compensation is placed in the channel 17 of the distributor 12 and secured to the distributor at two ends thereof. Aside from the physical (mechanical) contact between the waveguide and the distributor at the two ends of the latter, there is only thermal, non-mechanical contact between the grating region and the distributor.

The waveguide has a linearly chirped Bragg grating region 26 co-extensive with the distributor 12, the length of the distributor approximately matching the length of the grating region.

A temperature sensor, e.g. a thermistor 28 for sensing the temperature of the middle of the grating 26 is disposed approximately in the middle of the distributor 12, and is connected to the central control unit, not shown. Two thermistors 29 are mounted at the ends of the distributor. The TECs are mounted to a heat sink 31.

A strip-shaped resistive heating element 30 (FIG. 2), of uniform heat generation capacity along its length, is attached to the surface of the distributor coextensively with the grating region 26.

Because of the heat exchange between the distributor and the surroundings, temperature profile deviates from linear resulting in GDR and non-uniform dispersion. The strip-shaped heating element 30 is provided in order to compensate for the thermal losses from the distributor by delivering uniform heat. It was found that maintaining the centre of the distributor at exactly half the temperature span between the end points $$T_{mid} = \frac{T_1 + T_2}{2}$$

minimises the temperature sagging and GDR.

It is desirable to periodically dither, i.e. introduce small variations in the temperature profile (gradient) of the grating, and the resulting change in network performance (i.e. eye closure, or bit error rate) can serve as a feedback to make a decision on tuning the dispersion up or down. Typically one would require a dithering rate of ~1 Hz over few ps/nm of dispersion change. Ideally, during the dithering cycle no additional GDR should be introduced, i.e. the shape of the grating temperature profile should remain linear. In order to introduce the capability of fast change of the grating's temperature gradient, the invention provides linearly-variable heating means. Two versions are proposed and illustrated. In the first version, illustrated in FIG. 2, two resistive strip heaters 32, 34 are attached to the distributor over the open side of the channel 17. The heaters 32 and 34 are enveloped between two layers of a supporting material 35, e.g. Kapton and connected each to a controlled voltage source. When operated, the heat from the heaters 32, 34 is transferred to the grating region 26.

Figure 3:
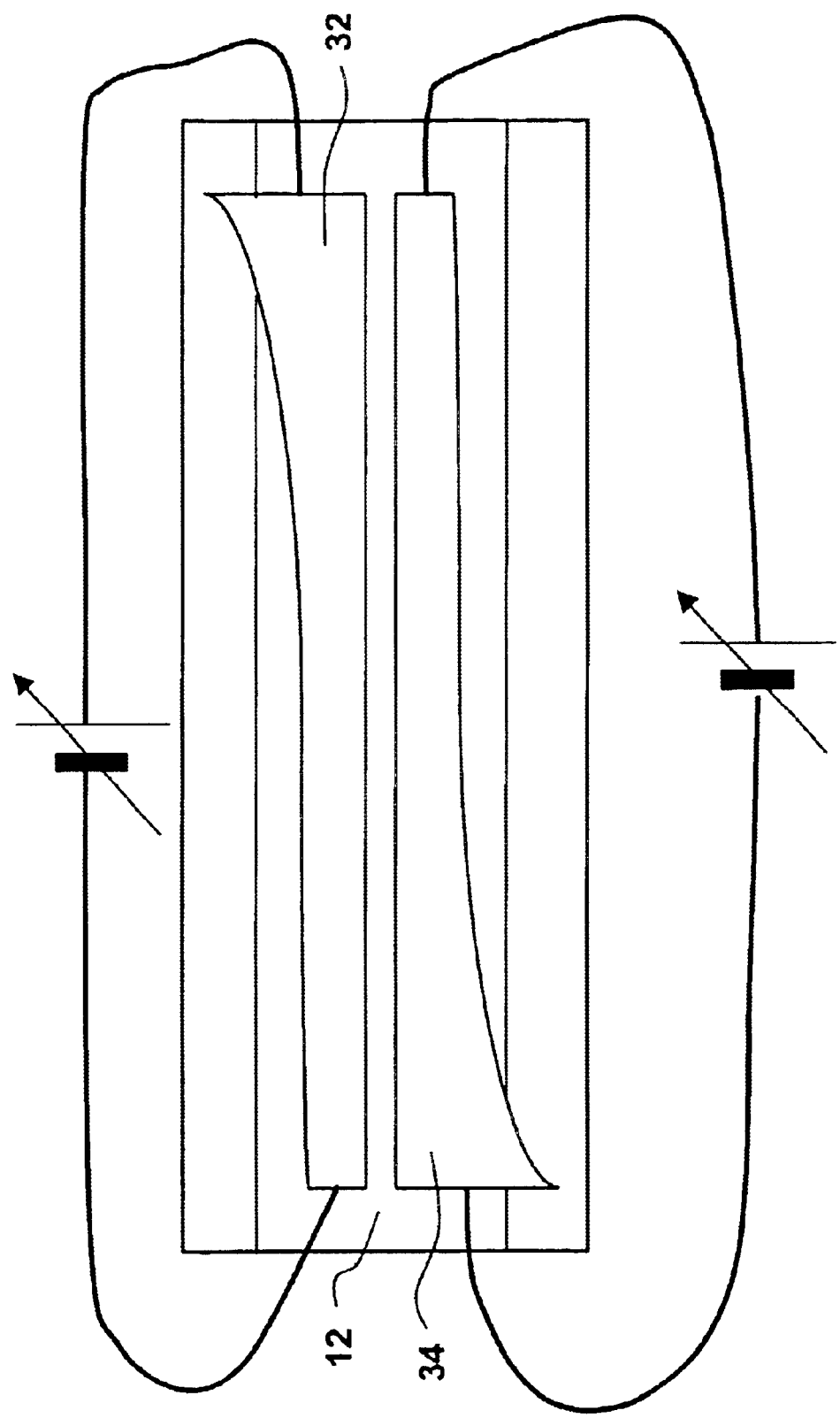
FIG. 3 represents a partial top view of the distributor.

As can be seen in FIGS. 2 and 3, the shape of each heater 32, 34 is tapered, with the taper directions being opposite. The shape of each taper is trimmed monotonically in such a way that the amount of resistive heat produced varies linearly along the distributor. By periodically switching the heaters on and off one after another, small linear change can be introduced in the grating temperature.

Figure 4:
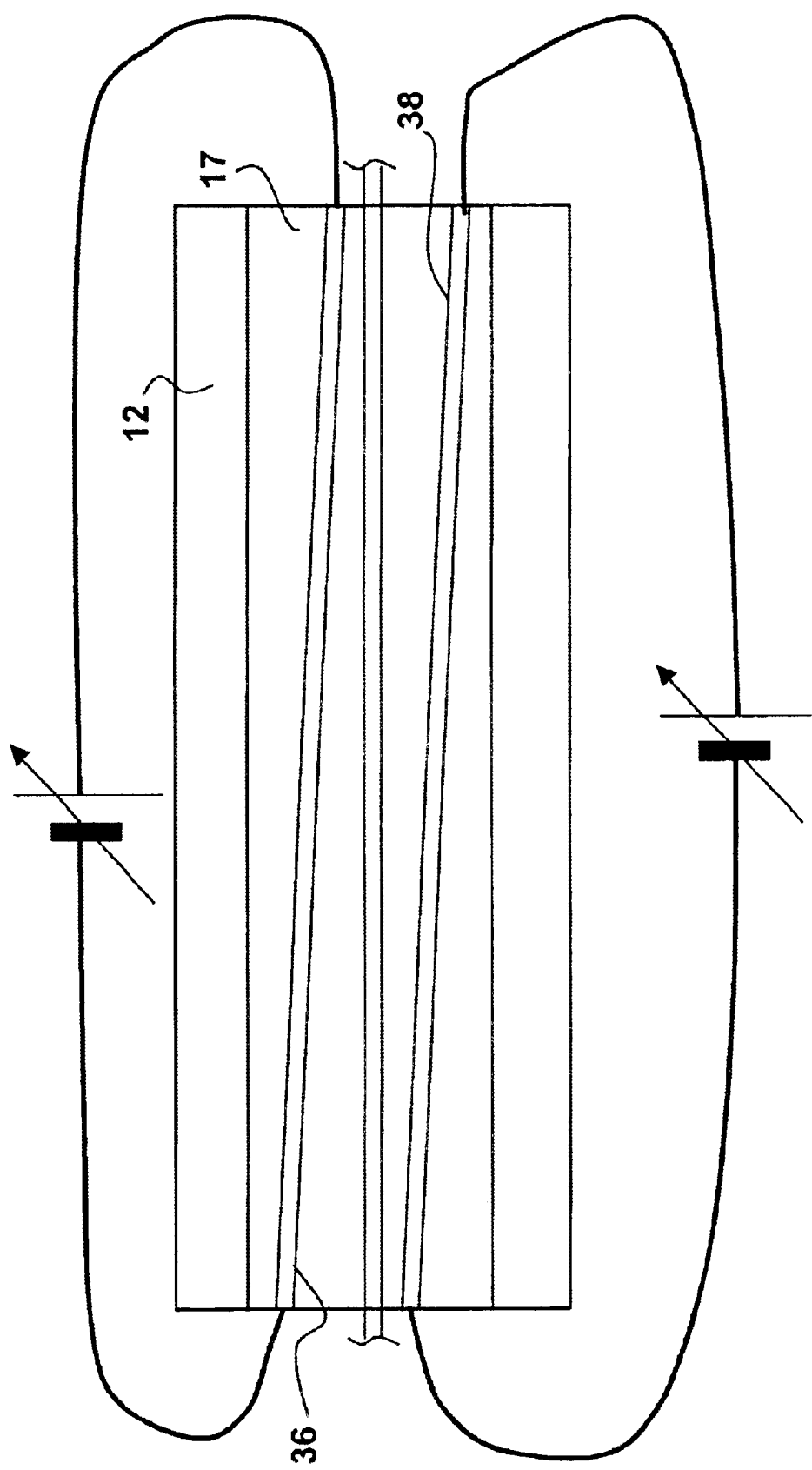
FIG. 4 is a top view of another embodiment of the compensator.

Alternatively, as illustrated in FIG. 4 and FIG. 5, the linearly variable heating means are provided by way of two uniform heating wires 36, 38 which are arranged at a variable spacing from the grating region, preferably but not necessarily inside the channel 17, the spacing defining two tapers of opposite direction as seen in FIG. 4.

While not described in detail herein, it is conceivable within the present state of the art to provide other linearly variable heating means for the above purpose.

It has been found that the provision of the uniform heating strip (30) and the temperature control (28) of the middle of the distributor, and hence of the grating region, is beneficial in maintaining a desirable linear temperature profile of the fiber grating.

Various alternatives and modifications of the above may occur to those skilled in the art, without departing from the scope and spirit of the invention as defined by the appended claims.

What is claimed is:

1. A dispersion compensator comprising:
   a length of a waveguide including a grating region having two opposite ends, wherein the grating region is a chirped Bragg grating,
   a heat distributing body extending along the grating region and in thermal non-mechanical contact therewith, the waveguide attached to the distributor at two ends thereof, and
   a heating element mounted to the body and extending along the grating region for controlled heating of the entire grating region.

2. The compensator according to claim 1 wherein the heat distributing body has at least one side wall forming a channel, the channel dimensioned to house the grating region of the waveguide.

3. The compensator according to claim 2 wherein the waveguide is affixed to the distributing body at least at the ends of the grating region.

4. The compensator according to claim 2 wherein the at least one side wall is profiled so that the cross-sectional area of the distributor is smallest in the middle of the distributor.

5. A dispersion compensator comprising:
   a length of a waveguide including a grating region having two opposite ends,
   a heat distributing body extending along the grating region and in thermal non-mechanical contact therewith, the waveguide attached to the distributor at two ends thereof,
   a heating element mounted to the body and extending alone the grating region for controlled heating of the entire grating region, and,
   a longitudinally variable heating means adjacent to and extending along the length of the distributing body and the grating region, the heating means adapted to provide a linearly variable heating intensity along the length of the grating region.

6. The compensator according to claim 5 wherein the longitudinally variable heating means comprises two heating elements having an opposite heating intensity variance.

7. The compensator according to claim 6 wherein the two heating elements are taper-shaped resistive heating elements mounted side-by side to the heat distributing body along the length of the grating region and operable to effect a variable substantially linear temperature gradient of the grating region.

8. The compensator according to claim 6 wherein the two heating elements are resistive heating elements mounted each along the grating region and variably spaced therefrom, the spacing of each element defining a taper of opposite direction relative to the taper of the other element.

9. A dispersion compensator comprising:
   a length of a waveguide including a grating region having two opposite ends,
   a heat distributing body extending along the grating region and in thermal non-mechanical contact therewith, the waveguide attached to the distributor at two ends thereof,
   a heating element mounted to the body and extending alone the grating region for controlled heating of the entire grating region
   temperature sensors disposed at the ends of the distributor and a temperature sensor disposed intermediate the ends of the distributor for generating a signal indicative of the temperature of the distributor, and
   a longitudinally variable heating means adjacent to and extending along the length of the distributing body and the grating region, the heating means adapted to provide linearly variable heating intensity along the length of the grating region.

10. The compensator according to claim 9 further comprising a control unit connected with the temperature sensor, the heating element and including a heating strip for controlling the heating of the grating region in response to the signal from the sensor.

11. A dispersion compensator comprising:
    a length of a waveguide including a grating region having two opposite ends,
    a heat distributing body extending along the grating region and in thermal non-mechanical contact therewith, the waveguide attached to the distributor at two ends thereof,
    a heating element mounted to the body and extending along the grating region for controlled heating of the entire grating region, and,
    a terminal heating means disposed at the two ends of the grating region for controlled heating of at least a part of the grating region.

12. The compensator according to claim 11 wherein the terminal heating means are thermoelectric coolers.

13. A dispersion compensator comprising
    an elongated body defining a channel therein along the length of the body,
    a length of an optical waveguide including a chirped Bragg grating region having two opposite ends, the optical waveguide disposed in the channel,
    a heating strip mounted to the body and extending along the grating region for controlled uniform heating of the entire grating region,
    a temperature sensor disposed in the mid-length of the distributor and the grating region for generating a signal indicative of the temperature of the grating region, and
    a longitudinally variable heating means adjacent to and extending along the length of the distributing body and the grating region for effecting a longitudinally varying heating of the grating region, the heating means having a monotonic heating-intensity variance along the length of the grating region.

14. The dispersion compensator according to claim 13 further comprising a terminal heating means attached at each of the opposite ends of the grating region for at least partial heating of the grating region.

15. The compensator of claim 14 wherein the terminal heating means are thermo-electric coolers.

16. The compensator according to claim 13 wherein the body has at least one wall of a varying cross-sectional area along its length, the cross-sectional area being smallest mid-length of the body.

17. The compensator of claim 13 further comprising two temperature sensors disposed adjacent the ends of the distributor for providing a feedback indicative of the temperature of the distributor at its ends.

* * * * *